Aug. 28, 1951     S. SEVERINI     2,566,147

HYDRAULIC BRAKE DEVICE

Filed Jan. 6, 1949     2 Sheets-Sheet 1

INVENTOR
SERGIO SEVERINI
By Young, Emery & Thompson
Attys.

INVENTOR
SERGIO SEVERINI
BY Young, Emery & Thompson
ATT'Y.

Patented Aug. 28, 1951

2,566,147

UNITED STATES PATENT OFFICE 2,566,147

HYDRAULIC BRAKE DEVICE

Sergio Severini, Rome, Italy, assignor to Officina Meccanica e Riparazioni — Omera — Società a. R. L., Rome, Italy, a company of Italy Application January 6, 1949, Serial No. 69,507
In Italy January 26, 1948

5 Claims. (Cl. 303—84)

Subject matter of the present invention is an improvement in hydraulic braking devices, which enables to secure the continuity and the efficiency during the operation of similar installations even in the case of break-downs or ruptures taking place in any of the elements of the said installation.

Such improvement consists in a device suitable for being fitted upon any industrial machine comprising hydraulically operated elements, yet particular description will be given of its application upon the brake installation of a motorcar.

In the common braking installations of motor vehicles, as a rule, a pump is connected with a set of pipings having their terminals close to the single wheels. In the case of such actually used arrangement, should an accidental rupture take place in any of the pipings containing the liquid which connects the pump with a wheel, the braking system, taken as a whole, becomes inefficient and liable of giving origin to serious inconveniences, particularly if the breakdown is during the motion of a vehicle.

Object of the present invention is to contrive a device to be inserted in the braking installation to the end of avoiding the possibility of similar incidents taking place. As a matter of fact, should during the motion of a motor-vehicle, come about the rupture of the piping relative to a wheel, in virtue of the invention, such piping becomes selfactingly cut off the brake-circuit, the latter preserving its full efficiency in regard of the remaining wheels.

The characteristic features of the device, as disclosed hereunder, render possible that the braking action remains efficient even in the case of ruptures or breakdowns taking place in more than one of the pipings.

The braking action upon those wheels in regard of which the connection have remained efficient, remains steady and constant even when the breakdowns or ruptures above mentioned have taken place.

The device forming the object of the present invention can be easily inserted in any already operating braking-installation, it being adapted to be fitted either directly on the pump-body or in another point of the framing in between the pump and the wheels, which might be considered as the most suitable for the given type of installation; in such a case, obviously, the device itself must be connected with the installation by means of opportunely chosen pipings. Correspondingly with the actual tendency in the motor vehicle manufacture of creating devices allowing the application upon the front wheels of a braking-power higher than that applied upon the rear-wheels, the device can be embodied in such a way as to consent such a possibility.

Lastly, the device can be fitted with a valve adapted to consent the maintenance inside the pipings, of a given initial pressure which prevents the said pressure from being discharged along the piping broken down, even when the eventual rupture is not a sudden one but a one taking place by progressive losses.

The device forming the object of the present invention is illustrated in the annexed sheets of drawing, wherein.

With reference to the drawing.

Figure 1:
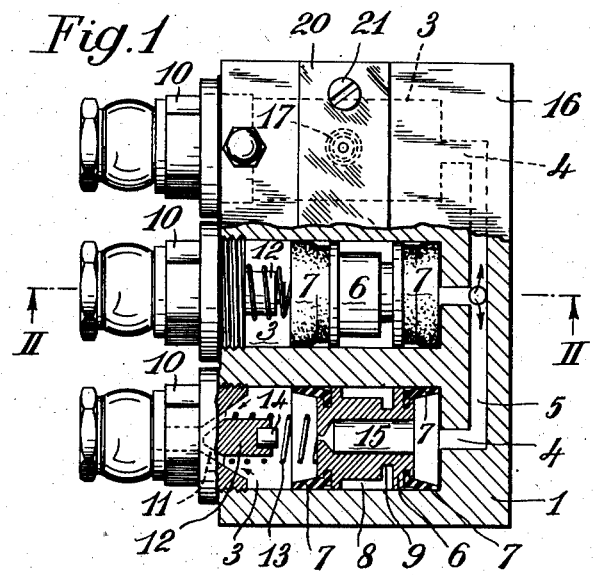
Figure 1 illustrates the device in a first form of practical embodiment, partly in elevational and partly in sectional view.

Reference character 1 indicates the body of the device which, in the shown form of practical embodiment, is fitted directly upon the body 2 of the hydraulic control pump.

The body of the device is provided with three cylindrically shaped chambers 3 which are in communication with the pump, through the bores 4 and the canal 5.

The chambers 3 are illustrated in the number of three, inasmuch as in the case in question, one of the said chambers has been contrived as being connected with the two front wheels, whereas each of the remaining ones is in connection with one of the rear wheels.

It being however obvious that the number of the chambers may vary between a minimal number of two and a maximal number corresponding to the number of the wheels to be braked.

The chambers 3 are preferably drilled to a diameter equal to the inside diameter of the cylinder of the pump, and in it is snugly sliding the piston 6 having its outside surface profiled in such a manner as to consent the application on its two ends, of two rubber rings 7.

Between the borders of such ends is comprised a cylindrical surface 8 as well as the circular groove 9.

The piston 7 is provided with the axial hole 15 running into a capillar opening which allows to equalize the pressure existing in the zones located both upstream and downstream of the piston. The end of the chambers 3 is screwed in order to receive a flange 10, which is screwed too and which is provided with a set of bores 11 for the passage of the liquid. The flange 10 has a small central boss 12 on which is engaged the spiral spring 13. On the face of the said boss 12 is wedged a small rubber cylinder 14 projecting slightly from the plane of the face itself, and which is provided there to the end of getting squeezed so as to obstruct the axial bore 15 of the piston, when the device enters its operative stage. In the wall 16 of the body 1 of the device is made a number of holes corresponding with each of the chambers 3, through which holes can penetrate the point of a pin 17 provided with collar 18 whereupon is exerted the intrinsic load of a spring 19 engaged on the pin itself.

The pins 17 are held in place with the holes of the body 1 by a transversal element 20, fixed on the body itself by means of the screws 21. Such said element is provided with recesses 22 which contain the tips of the said pins 17 on which are engaged the springs 19.

Under normal operative conditions, the ends of the pins 17 by projecting themselves into the chambers 3 bear against the cylindrical surface 8 of the piston 6.

On to the flange 10 are screwed the joints 23 of the pipings leading to the various wheels to be braked.

Figure 2:
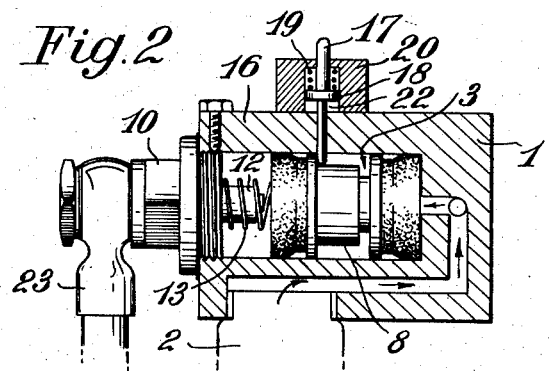
Figure 2 is a section on the line 2—2 of Figure 1 (wherein the piston is shown in elevation)
Figure 3:
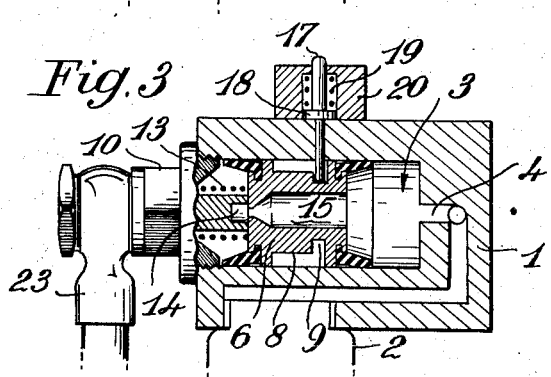
Figure 3 shows in sectional view, the position assumed by the organs of an element of the device following a breakdown or a rupture taken place in the relative hydraulic piping.

From an examination of the Figures 1, 2 and 3 become clear also the operational way of the device forming the object of the invention.

When the braking installation is efficient in all its parts, and when all the pipings are filled up with brake-liquid, the piston 6 is enabled to accomplish, under the action of the actuating pump 2, an excursion which has a maximal value corresponding to the height of the cylindrical zone 8; in the practice, such an excursion will turn out as always remarkably inferior to the said maximal value.

Should any rupture take place, in one of the pipings corresponding to any of the chambers 3, at the moment of the braking, as the relative piston 6 meets with no resistance along its stroke, it will be able of accomplishing such an excursion as to be brought in contact with the small rubber cylinder 14, in the position illustrated by the Figure 3.

During such stroke, the end of the pin 17, upon reaching at the extremity of the cylindrical surface 8, and under the action of the spring 19 penetrates into the groove 9 of the piston 6 blocking the latter in position of closure. The small rubber cylinder 14, under the action of the hydraulic pressure, gets squeezed to such an extent as to allow that the piston 6 and the boss 12 are pressing against each other. One obtains thus the hermetical sealing of the axial hole 15 avoiding every possible leakage of liquid toward the broken pipe, whereas the braking element, connected therewith, is hence secluded from the operation of the installation which continues to be efficient as far as the remaining chambers are concerned. At the repristination of the efficiency of the apparatus, the pins 17 may be manually set back into their initial position.

Since the rupture of one pipe might also be unnoticed by the driver, there could be foreseen the application of a device, none illustrated in the figure, serving for both luminous and acoustical signaling, entering automatically in operative phase under the action of the pin, which is pushed forward to block the corresponding piston in position of closure.

In an identical way, also in the example illustrated in the figures, the chambers 3 are set side by side, it being however obvious that they might assume any other position relative to each other; also the device could be arranged in any way whatever (upright, lying on its side, upside down).

The thus far disclosed example has illustrated a device comprising three cylindrical chambers of equal diameter, hence adapted to exert identical braking actions upon the elements undergoing the said action.

Figure 4:
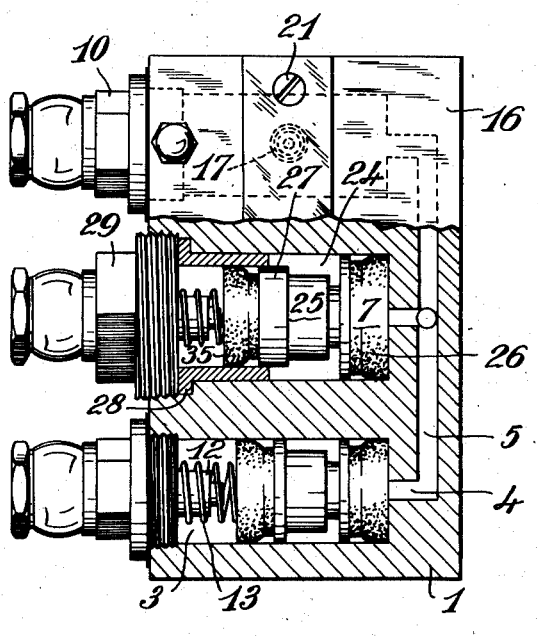
Figure 4 illustrates partly in elevation and partly in section, another form of practical embodiment of the device consenting to exert the wheel or couple of wheels a braking-action higher than the one which is exerted on the others.

On the other hand, Figure 4 is illustrating the case in which upon one of the elements to be braked there should be exerted an action higher than the one exerted upon the others; such would be the case, as already mentioned, of a more intense braking action exerted upon the front wheels in comparison with the one exerted upon the rear wheels.

In similar case, the central chamber 24 (Figure 4) will have a diameter greater than that of the chambers 3. The zones of the piston 25 designed to slide inside the chamber, have two different diameters, and precisely that of the zone 26 which receives the pressure of the pump is greater than the diameter of the zone 27 which is pressing upon the liquid operating the braking action upon the front wheels.

In this way the braking-power upon these latter will turn out higher. In order to allow the operation of such a differential piston, in the chamber 24 is introduced a bushing 28, which is held in place by the auxiliary of the flange 29, screwed into the body 1 of the device.

The inside diameter of the bushing 28 is equal to the outside one of the zone 27, minus the allowances made for the sliding of the piston in the said bushing.

Also the rubber ring 35 engaged on the piston 25 is smaller than the rubber ring 7 engaged on the same piston on the pump's side.

Figure 5:
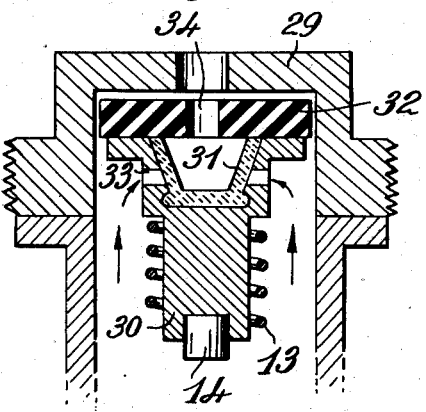
Figure 5 illustrates, on enlarged scale, the valve with which the device is fitted on the purpose of maintaining inside the pipes a given initial pressure.

Figure 5 illustrates at last the case in which the flange 10 is fitted with a valve enabling to maintain inside the pipes an initial pressure preventing this latter from being discharged through the deteriorated pipes in the case of not a sudden rupture but of a gradually proceeding leakage.

In such event, the small rubber cylinder 14 (Figure 5) is borne on a small metallic plug 30, made e. g. of bronze, whereon is engaged the spiral spring 13. The said small plug 30, is provided, in its upper part, with a cavity in which is introduced the internally concavous profiled rubber 31.

In the portion of the plug 30, which corresponds to such cavity is bored the diametral hole 33 which allows the passage of the oil after previous compression of the extremity of the said profiled rubber 31 and the hole 34 of the rubber disc 32 set on top of the small plug 30.

At the end of the braking the oil tends to accomplish the inverted itinerary through the hole 34 of the rubber disc 32. Yet, there being no possibility to flow through the bore 33, it will squeeze the packing 31 and compress the spring 13 causing the small plug 30 to withdraw. In this manner the oil is allowed to pass in between the head of the small plug and the wall of the flange 29. For such purpose the head of the small plug 30 whereon is resting the rubber disc 32 instead of having a circular cross-section possess a hexagonal cross-section.

Obviously, the operation of the contrivance becomes manifest in respect of the pipings efficient as compare with the deteriorated ones in regard of which the said contrivance will not become operative.

I claim:

1. A safety device for hydraulic brakes particularly for motor vehicles, comprising a plurality of chambers, means for supplying brake fluid under pressure to one end of each of said chambers, screw plugs for closing the other ends of each of said chambers, each of said plugs having central opening and a connection for piping said fluid to a wheel, a piston in each of said chambers, each of said pistons having an axial cylindrical bore extending from one end thereof and terminating in a frustro-conical portion near the other end thereof, and a capillary bore extending through said other end to said frustro-conical portion, rubber packing members on each end of said pistons for sealing against the walls of the chambers, a cylindrical member located in each of said chambers near said screw plugs, a spring surrounding each of said cylindrical members and of a length greater than the length of the cylindrical member so as to abut the head of the piston, and each of said cylindrical members having a central cavity with a small rubber cylinder wedged therein, said rubber cylinders projecting from said cavities and serving to close the axial bore of the piston when said piston has effected the complete forward stroke allowed inside the chamber.

2. A safety device for hydraulic brakes particularly for motor vehicles, comprising a plurality of chambers, means for supplying brake fluid under pressure to one end of each of said chambers, screw plugs for closing the other ends of each of said chambers, each of said plugs having central opening and a connection for piping said fluid to a wheel, a bushing located adjacent each of said screw plugs for reducing the diameter of said chambers at the end portion thereof, a piston in each of said chambers, said pistons being axially bored through their lengths and having an end portion thereof of less diameter than said bushings, rubber packing members on each end of said pistons for sealing against the walls of said chamber and said bushing respectively, a cylindrical member located in each of said chambers near said screw plugs, a spring surrounding each of said cylindrical members and of a length greater than the length of the cylindrical member so as to abut the head of the piston, and each of said cylindrical members having a central cavity with a small rubber cylinder wedged therein, said rubber cylinders projecting from said cavities and serving to close the axial bore of the piston when said piston has effected the complete forward stroke allowed inside the chamber.

3. A safety device for hydraulic brakes particularly for motor vehicles, comprising a plurality of chambers, means for supplying brake fluid under pressure to one end of each of said chambers, screw plugs for closing the other ends of each of said chambers, each of said plugs having central opening and a connection for piping said fluid to a wheel, a piston in each of said chambers, each of said pistons being axially bored through its length and having a rubber packing member on each end thereof for sealing against the walls of the chamber, said screw plugs each having a cylindrical member integral therewith and extending into said chamber, said cylindrical members each having a plurality of bores leading from said chamber to the central openings of said plugs, a spring surrounding each of said cylindrical members and of a length greater than the length of the cylindrical member so as to abut the head of the piston, and each of said cylindrical members having a central cavity with a small rubber cylinder wedged therein, said rubber cylinders projecting from said cavities and serving to close the axial bore of the piston when said piston has effected the complete forward stroke allowed inside the chamber.

4. A safety device for hydraulic brakes particularly for motor vehicles, comprising a plurality of chambers, means for supplying brake fluid under pressure to one end of each of said chambers, screw plugs for closing the other ends of each of said chambers, each of said plugs having central opening and a connection for piping said fluid to a wheel, a piston in each of said chambers, each of said pistons being axially bored through its length and having a rubber packing member on each end thereof for sealing against the walls of the chamber, a cylindrical member located in each of said chambers near said screw plugs, each of said cylindrical members having a frustro-conical cavity therein with radial holes extending through the side walls of said cavity, a concavous profiled rubber member in each of said frustro-conical cavities adhering to the walls thereof, a spring surrounding each of said cylindrical members and of a length greater than the length of the cylindrical member so as to abut the head of the piston, and each of said cylindrical members also having a central cavity with a small rubber cylinder wedged therein, said rubber cylinders projecting from said cavities and serving to close the axial bore of the piston when said piston has effected the complete forward stroke allowed inside the chamber.

5. A safety device for hydraulic brakes particularly for motor vehicles, comprising a plurality of chambers, means for supplying brake fluid under pressure to one end of each of said chambers, screw plugs for closing the other ends of each of said chambers, each of said plugs having central opening and a connection for piping said fluid to a wheel, a piston in each of said chambers, each of said pistons being axially bored through its length and having a rubber packing member on each end thereof for sealing against the walls of the chamber, a cylindrical member located in each of said chambers near said screw plugs, each of said cylindrical members having a frustro-conical cavity therein with radial holes extending through the side walls of said cavity, a concavous profiled rubber member in each of said frustro-conical cavities adhering to the walls thereof, a rubber disc member located between each of said cylindrical members and said plugs, each of said rubber disc members having a diameter less than the diameter of said chambers and having a central hole corresponding to the central opening in said plugs, a spring surrounding each of said cylindrical members and of a length greater than the length of the cylindrical member so as to abut the head of the piston, and each of said cylindrical members also having a central cavity with a small rubber cylinder wedged therein, said rubber cylinders projecting from said cavities and serving to close the axial bore of the piston when said piston has effected the complete forward stroke allowed inside the chamber.

SERGIO SEVERINI.

REFERENCES CITED

The following references are of record in the file of this patent:

UNITED STATES PATENTS

| Number | Name | Date |
|---|---|---|
| 2,166,747 | Best | July 18, 1939 |
| 2,216,570 | Hollingshead | Oct. 1, 1940 |
| 2,253,580 | Rahe | Aug. 26, 1941 |
| 2,292,925 | Bourgeois | Aug. 11, 1942 |